United States Patent [19]

Nozaki

[11] Patent Number: 5,072,545
[45] Date of Patent: Dec. 17, 1991

[54] WEATHER STRIP FOR DOOR GLASS

[75] Inventor: Masahiro Nozaki, Ama, Japan

[73] Assignee: Toyoda Gosei Co., Ltd., Nishikasugai, Japan

[21] Appl. No.: 545,146

[22] Filed: Jun. 28, 1990

Related U.S. Application Data

[63] Continuation of Ser. No. 295,359, Jan. 10, 1989, abandoned.

[30] Foreign Application Priority Data

Feb. 15, 1988 [JP] Japan .............................. 63-18593[U]
May 9, 1988 [JP] Japan .............................. 63-60959[U]
Jul. 19, 1988 [JP] Japan .............................. 63-95914[U]

[51] Int. Cl.$^5$ .............................................. E06B 7/16
[52] U.S. Cl. ......................................... 49/488; 49/498
[58] Field of Search ................. 49/488, 490, 493, 499, 49/478, 498; 296/146

[56] References Cited

U.S. PATENT DOCUMENTS 2,737,412  3/1956  Smith et al. ............................ 49/493
2,928,145  3/1960  Foley ...................................... 49/478
4,756,944  7/1988  Kisanuki .

FOREIGN PATENT DOCUMENTS 0192637  11/1984  Japan .................................... 49/490
60165213  11/1985  Japan .
2150191  7/1985  United Kingdom .................. 49/488

Primary Examiner—Kenneth J. Dorner
Assistant Examiner—Gerald A. Anderson
Attorney, Agent, or Firm—Cushman, Darby & Cushman

[57] ABSTRACT

A door glass weather strip mounted along a door opening or a door frame of a motor vehicle for sealing an end edge of a door glass when the door glass is closed, has a base portion to be mounted along the door opening or the door frame, and a seal wall to be pressed upward by the end edge of the door glass. The base portion and the seal wall form a hollow body. The seal wall is bent at a center in the widthwise direction of a vehicle body so as to have a L-shaped section. An outer half portion of the seal wall is formed thin and an inner half portion thereof is formed thicker than the outer half portion. An inner wall of the inner half portion is cut off at a root thereof to form a thin-walled root portion. Whereby when the seal wall is pressed upward by the end edge of the door glass, the inner half portion of the seal wall turns about the thin-walled root portion, and accordingly the end edge of the door glass is completely covered with the outer half portion of the seal wall with the desirable sealing performance.

7 Claims, 5 Drawing Sheets

WEATHER STRIP FOR DOOR GLASS

This is a continuation of application Ser. No. 07/295,359, filed Jan. 10, 1989 now abandoned.

BACKGROUND OF THE INVENTION

1. Field of the Invention

The present invention relates to a weather strip for a door glass (hereinafter will be called weather strip) which is employed in a motor vehicle.

2. Description of the Prior Art

In a hardtop-typed motor vehicle provided with frameless doors, a weather strip is mounted along a door opening of a vehicle body. When the door is closed, the outer periphery of the door glass is pressed against the weather strip to seal a space between the door glass and the vehicle body.

In a motor vehicle provided with door frames, a weather strip of the same kind as the above-described weather strip is mounted along the inner periphery of a door frame. When the door glass is closed, the outer periphery of the door glass is pressed against the weather strip.

FIG. 9 illustrates a conventional weather strip of this kind. A weather strip 5 is retained by a retainer 4 along a door opening of a vehicle body, which is to be closed by a door glass 6. The weather strip 5 is provided with a hollow seal portion of which a seal wall 52 is opposed to an end edge of the door glass 6. When the door glass 6 is closed, the seal wall 52 is pressed upward by the end edge of the door glass 6.

The weather strip 5 is required to exhibit excellent sealing performance, that is excellent waterproof performance, and excellent sound-insulating performance. The sealing performance is considered to be improved by increasing the pressure-contacting force of the door glass 6 to the seal wall 52, or increasing the contacting area in which the end edge of the door glass is covered with the seal wall 52.

The above-described pressure-contacting force can be increased by making the thickness of the seal wall 52, which is pressed upward by the door glass 6 large to increase the flexural stiffness thereof. However, as the pressure-contacting force is increased, the door glass closing force is increased undesirably.

The above-described contacting area can be increased by making the whole of the seal wall 52 thin so as to be easily deformed, and forming the seal wall 52 not tightly but loosely. However, in this case, because of the decrease in thickness of the seal wall 52, the sufficient sealing performance cannot be obtained.

FIGS. 10 and 11 illustrate another example of the conventional weather strip mounted along the door frame. The weather strip 5 is composed of a base portion 51 formed from solid rubber, and a seal wall 52 formed from sponge rubber. The base portion 51 has a downward opening U-shaped cross section, and is composed of a bottom wall 511 and side walls 512, 513. A retaining portion 50 of an upward opening U-shaped cross section is integrally formed with the side wall 512. This retaining portion 50 functions as a trim, too.

The seal wall 52 is bent at its central portion in the widthwise direction of the vehicle body so as to have a L-shaped cross section thereby to form a hollow body with the base portion 51. The seal wall 52 is composed of an outer half portion 52a and an inner half portion 52b of which the thickness is larger than that of the outer half portion 52a. The weather strip 5 having the above-described structure is mounted on a flange 71 of a door frame 7 in the retaining portion 50.

When the door glass 6 is guided upward to fully close the door opening as shown in FIG. 11, the bent portion of the seal wall 52 does not come in contact with the inner side surface of the door glass 6 to generate a space 9.

In the viewpoint of the sealing performance and the sound-insulating performance, it is desired that the end edge of the door glass 6 is completely covered with the seal wall 52 without any generation of such a space 9.

Moreover, the fully closed position of the end edge of the previously mounted door glass 6 is inevitably scattered a little in each car. In the case of the fully-closed position being high, the outer half portion 52a of the seal wall 52 is more strongly pressed upward by the door glass 6 while the thicker inner half portion 52b is not deformed thereby. This results in the side wall 513 of the base portion 51, to which one end of the outer half portion 52a is connected, being pulled in the direction of the inside of the vehicle body so that a tip end of the outer side wall 513 presses the door glass 6 inwardly. Therefore, the generation of the space 9 can be prevented, but the discontinuity in the outer surfaces of the door frame 7 and the door glass 6 becomes large.

Recently, it has been required to continue the outer surfaces of the respective vehicle body, door frame and door glass without any irregularities. Under these circumstances, the above-described large discontinuity is undesirable.

SUMMARY OF THE INVENTION

It is an object of the present invention to provide a weather strip which can cover an end edge of a door glass with the excellent sealing performance, and prevent the door glass from being pressed in the direction of a vehicle compartment as well as preventing the increase in the door glass closing force, when the door glass is fully closed.

The weather strip according to the present invention is provided with a hollow body composed of a base portion mounted along a door opening or a door frame of a vehicle body, and a seal wall to which an end edge of a door glass is pressed. The seal wall is bent at the central portion in the widthwise direction of the vehicle body at an obtuse angle, and the resulting bent portion projects outward so that the seal wall has a L-shaped cross section. The outer half portion of the seal wall on the outside of the vehicle extends in a direction nearly perpendicular to that in which the door glass is guided to be closed. To this surface of the seal wall is pressed an end edge of the door glass when the door glass is fully closed. The inner half portion of the seal wall on the inside of the vehicle is made thicker than the outer half portion thereof. A root portion of the inner half portion, to which the base portion is connected is shaped thinner to enable the inner half portion to turn about the root portion.

When the door glass is guided upward, the door glass presses the outer half portion of the seal wall of the weather strip upward. This results in the inner half portion being turned upwards about the root portion thereof. And when the door glass reaches its fully closed position, the inner half portion makes a nearly right angle to the inner side surface of the door glass. A tip end of a side wall on the outside of the vehicle body, which is connected to the outer half portion of the seal wall, is drawn in the direction of the vehicle compartment to press the outer side surface of the end edge of the door glass. This pressing force of the side wall is supported by the thick-walled inner half portion having stiffness through the door glass.

Therefore, the end edge of the door glass is completely covered with the seal wall to provide the good sealing performance. Moreover, when the door glass presses the seal wall upwards, the inner half portion of the seal wall is turned about the root portion thereof. Accordingly, the door glass closing force is scarcely increased.

BRIEF EXPLANATION OF THE DRAWINGS

FIG. 2 illustrates the state where a door glass is opened;

FIG. 3 illustrates the state where the door glass is fully closed;

FIG. 5 illustrates the state where a door glass is opened;

FIG. 6 illustrates the state where the door glass is closed;

FIG. 7 illustrates the state where a door glass is opened;

FIG. 8 illustrates the state where the door glass is closed;

FIG. 10 illustrates the state where a door glass is opened; and

FIG. 11 illustrates the state where the door glass is closed.

DETAILED DESCRIPTION OF EMBODIMENTS

Figure 1:
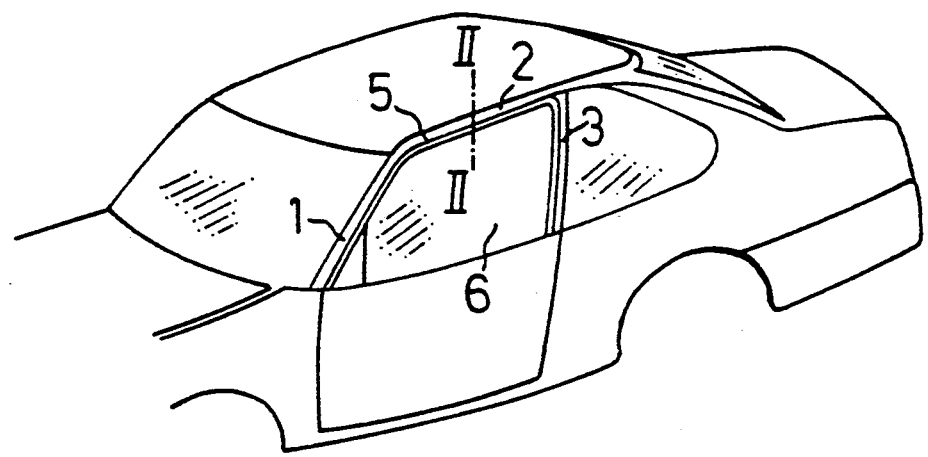
FIG. 1 is a perspective view of a motor vehicle to which a first embodiment of a weather strip according to the present invention is applicable.
Figure 2:
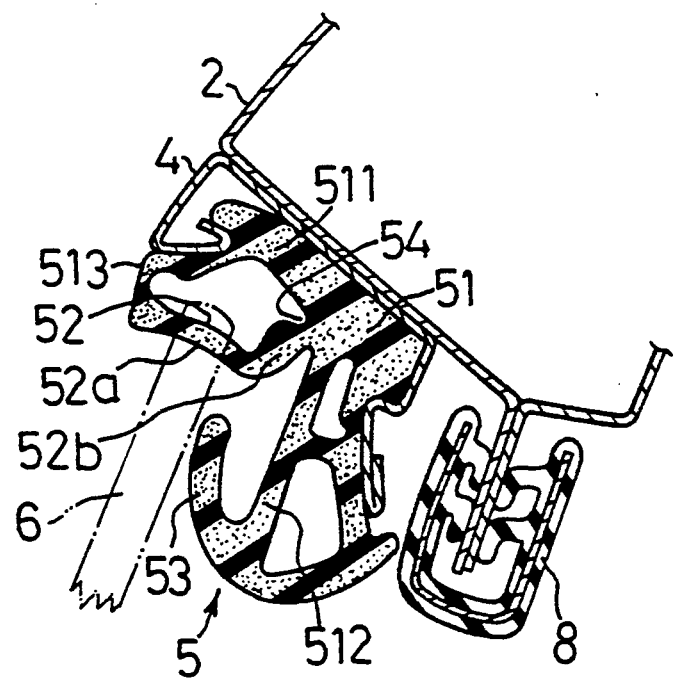
FIGS. 2 and 3 are sectional view of the weather strip, each being taken along the line II—II of FIG. 1.
Figure 3:
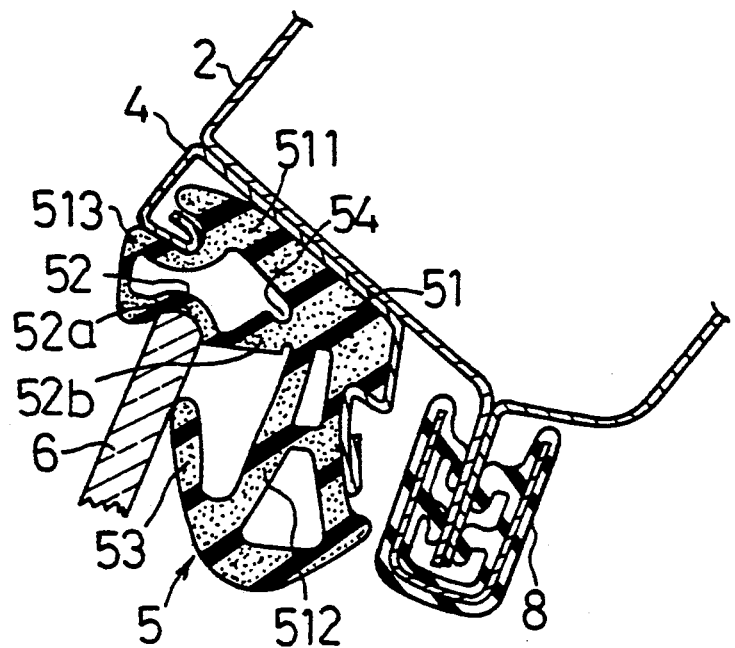

FIGS. 1 through 3 illustrate a first embodiment of a weather strip according to the present invention. As shown in FIG. 1, a door opening of a hardtop-typed motor vehicle is composed of a front pillar 1, a roof side 2 and a center pillar 3. To the door opening is mounted a weather strip 5 formed from sponge rubber by means of a retainer 4 as shown in FIG. 2.

In FIG. 2, the weather strip 5 is fitted in the retainer 4 in a base portion 51 thereof. The base portion 51 is provided with a door glass receiving portion of a downward opening U-shaped section, which is composed of a bottom wall 511, a side wall 512 on the inside of the vehicle body, and a side wall 513 on the outside of the vehicle body.

The side wall 512 is hollow and extends downward. From a tip end of the side wall 512 is extended an inner lip 53. The reference numeral 8 represents a trim mounted around the door opening.

A seal wall 52 of a L-shaped section is connected to both a tip end of the side wall 513 and an inner end of the bottom wall 511 to define a hollow space. The seal wall 52 is bent at an obtuse angle approaching a right angle at the center in the widthwise direction thereof.

An outer half portion 52a of th seal wall 52 on the outside of the vehicle body has a surface extending in approximately parallel with the bottom wall 511 and in a direction nearly perpendicular to the direction in which a door glass 6 is pressed upwards. An inner half portion 52b extends diagonally upwards with respect to the direction in which the door glass 6 is pressed upwards. The inner half portion 52b is thicker than the outer half portion 52a, and the thickness of the inner half portion 52b is increased in the direction of the bottom wall 511. A thin-walled root portion 54 of a thickness approximately equal to that of the outer half portion 52a, is formed by cutting off the inner wall of the root portion of the inner half portion 52b whereby the inner half portion 52b is turnable about the thin-walled root portion 54.

In operation, when the door glass 6 is guided upward and is fully closed, the outer half portion 52a of the seal wall 52 is pressed upward by the end edge of the door glass 6. This results in a tip end of the inner half portion 52b, which forms the bent portion of the seal wall 52, being lifted upward, and accordingly, the inner half portion 52b being turned about the thin-walled root portion 54. Therefore, the resistance against the upward movement of the door glass can be small.

When the door glass 6 reaches its fully closed position, a tip end of the side wall 513 is drawn inward to press the outer side surface of the end edge of the door glass 6 inward. As the door glass 6 is guided upward, the inner half portion 52b is turned about the root portion 54 and approaches the inner side surface of the door glass 6 in a direction perpendicurar thereto. And the thick-walled inner half portion 52b supports the inner side surface of the door glass 6 against the pressing force of the side wall 513. As a result, the end edge of the door glass 6 is covered with the seal wall 52 in both side surfaces and end surface thereof.

Figure 4:
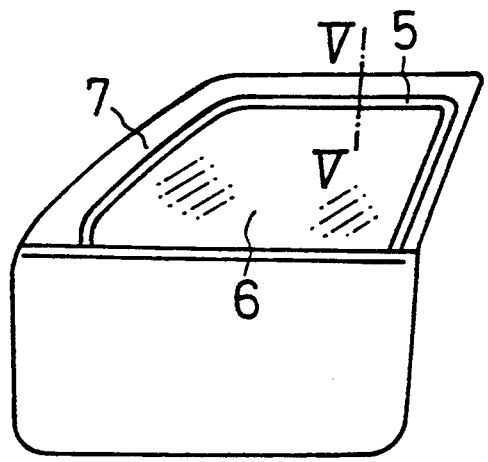
FIG. 4 is a front view of a vehicle door to which a second embodiment of a weather strip according to the present invention is applicable.
Figure 5:
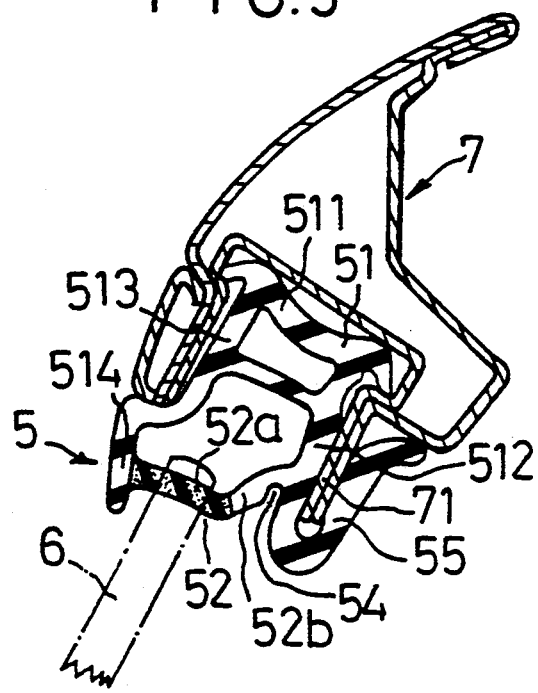
FIGS. 5 and 6 are sectional views of the weather strip, each being taken along the line V—V of FIG. 4.
Figure 6:
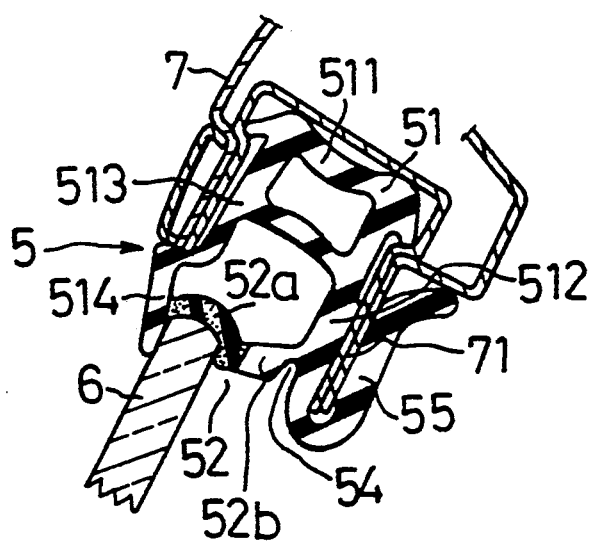

FIGS. 4 through 6 illustrate a second embodiment of the weather strip according to the present invention, which is mounted along an inner periphery of a door frame 7. In the drawings, the weather strip 5 is provided with a base portion 51 of a U-shaped section. A bottom wall 511 of the base portion 51 is formed hollow. A tip end portion of the molding lip 514 extending from a side wall 513 is connected to a side wall 512 on the inside of the vehicle body through a seal wall 52 which is bent at an obtuse angle at the center in the widthwise direction thereof. The base portion 51 is fitted in the door frame 7, and the side wall 512 which makes a U-shaped section with the retaining lip 55, is retained by a flange 71 of the door frame 7.

An outer half portion 52a of the seal wall 52, which is to be pressed upward by the door glass 6, extends in a direction perpendicular to the direction in which the door glass 6 is pressed upward. And an inner half portion 52b extends diagonally with respect to the pressing direction of the door glass 6. The inner half portion 52b is made thick and the root portion 54 thereof is formed thin by cutting off the outer wall thereof so as to make the inner half portion 52b turnable about the root portion 54.

The outer half portion 52a is formed from sponge rubber while the other portion of the weather strip 5 is formed from solid rubber.

When the outer half portion 52a of the weather strip 5 according to the second embodiment, is pressed upward by the closed door glass 6, the inner half portion 52b is turned upward about the root portion 54 similarly to the case of the weather strip according to the first embodiment.

When the door glass 6 is guided upward to its fully closed position as shown in FIG. 6, the end edge of the door glass 6 is caught by the molding lip 514 and the outer half portion 52a, and covered therewith.

Figure 7:
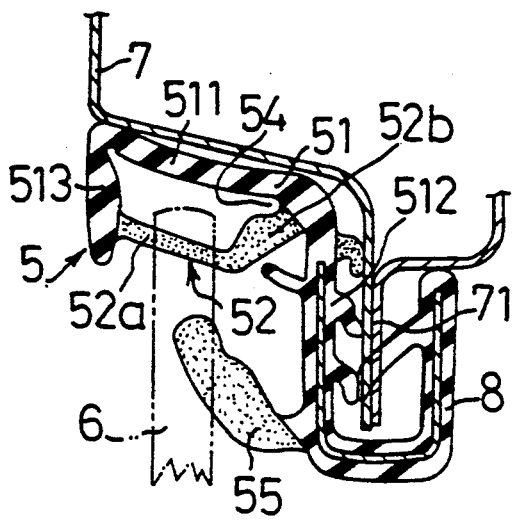
FIGS. 7 and 8 are sectional views of a third embodiment of a weather strip according to the present invention.
Figure 8:
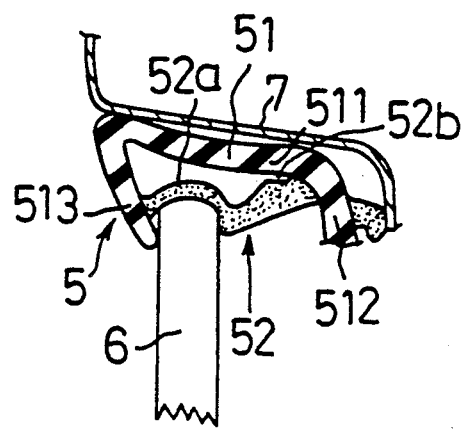
Figure 9:
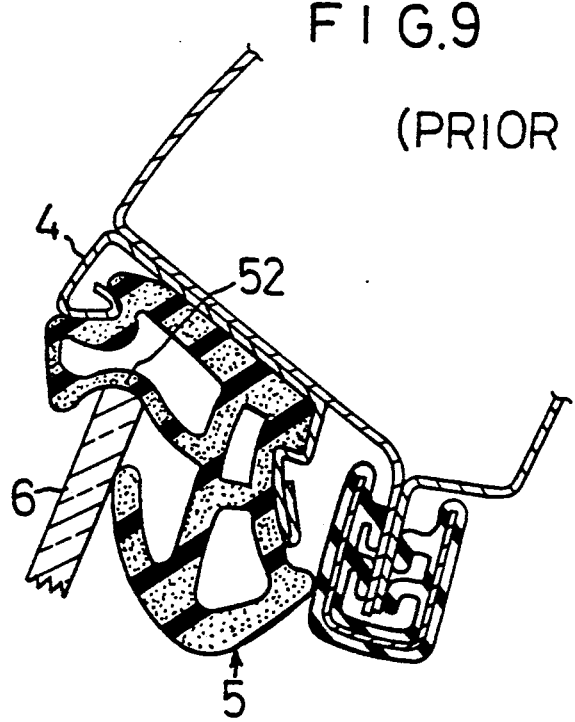
FIG. 9 is a sectional view of one example of the conventional weather strip in the state where a door glass is closed.
Figure 10:
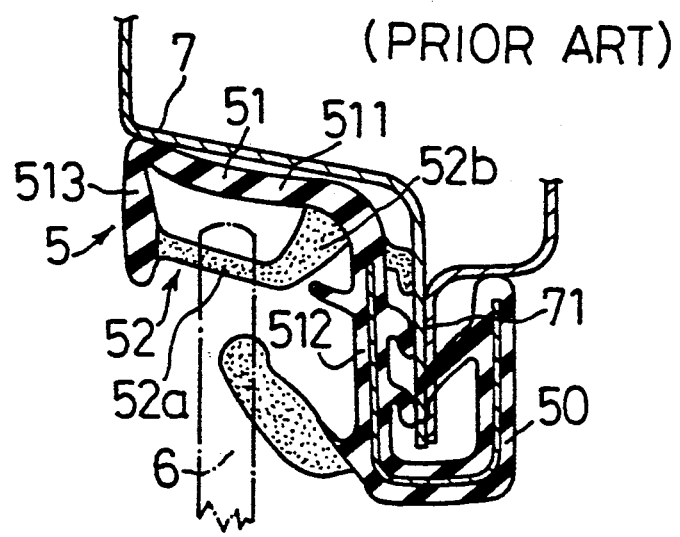
FIGS. 10 and 11 are sectional views of another example of the conventional weather strip.
Figure 11:
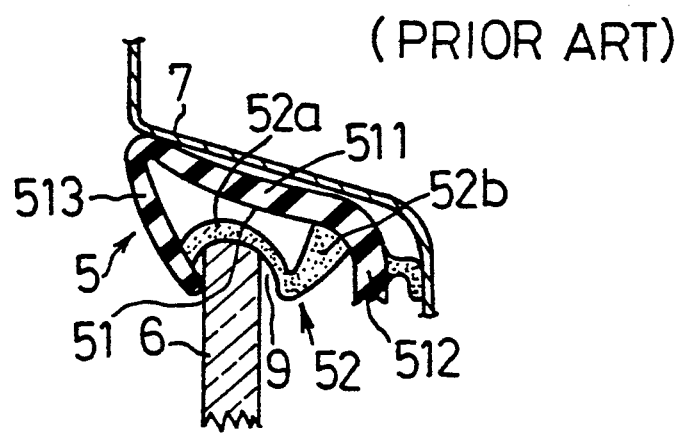

FIGS. 7 and 8 illustrate a third embodiment of a weather strip which is mounted along an inner periphery of a door frame 7.

In the drawings, in an end portion of the base portion 51 on the outside of the vehicle body is formed a door glass receiving portion of a U-shaped section, which is composed of a bottom wall 511, a side wall 512 on the inside of the vehicle body and the side wall 513 on the outside of the vehicle body. This door glass receiving portion and a seal wall 52 forms a hollow body. The side wall 512 is bent to have a U-shaped section in its lower end thereby to form a trim 8.

An inner end of an inner half portion 52b of the seal wall 52 is connected to a corner portion between the bottom wall 511 and the side wall 512. And a root portion 54 is formed thin by cutting off the inner wall thereof so that the inner half portion 52b is turnable about the thin-walled root portion 54. A lip 55 extends from the side wall 512 and a tip end thereof comes in contact with the inner side surface of the door glass 6. The lip 55 and the seal wall 52 are formed from sponge rubber while the base portion 51 including the trim 8 is formed from solid rubber.

The other construction of the third embodiment is substantially equal to that of the weather strip of the second embodiment.

The weather strip of the third embodiment exhibits substantially the same operation effect as that of the second embodiment.

As described above, in the weather strip according to the present invention, the contacting area for the end edge of the door glass can be increased, and the sealing performance is much improved as compared with the conventional weather strip. In addition, the inner half portion of the seal wall is made turnable about the root thereof. Therefore, both the door glass closing force in the case where the door glass is lifted upward to its closed position, and the door closing force in the case where the door is closed with the door glass fully closed, are not increased.

What is claimed is:

1. A door glass weather strip mounted along a door opening or a door frame of a motor vehicle sealing an end edge of a door glass when the door glass closes the opening, comprising:
    a base portion to be mounted along the door opening or the door frame; and
    a seal wall, having ends connected to said base portion to form a hollow body, a part of said seal wall being pressed into said hollow body by the end edge of the door glass when the door glass fully closes the opening;
    said seal wall having a first leg and a second leg integrally formed to give the seal wall an L-shape, the legs intersecting to form an elbow directed toward the door glass end edge, the first leg forming an outer portion of said seal wall with respect to said vehicle which outer portion is to be pressed by the end-edge of the door glass when the opening is closed, the first leg extending in a direction nearly perpendicular to a direction in which the door glass is moved to close the opening, the first leg having a special thickness, and the second leg forming an inner portion and a root portion, said second leg being thicker than said outer portion except at the root portion which is at an end of said inner portion which is connected to said base portion, said root portion being thinner than said inner portion having a thickness substantially equal to that of said first leg whereby said inner portion is turned about said thin-walled root portion when said first leg is pressed by the end edge of the door glass.

2. A weather strip according to claim 1, wherein said seal wall is bent at an obtuse angle.

3. A weather strip according to claim 2, wherein said base portion is provided with a door glass receiving portion of a U-shaped section at a position opposite to the end edge of the door glass, and said seal wall forms said hollow body by closing an opening of said door glass receiving portion.

4. A weather strip according to claim 3, wherein said inner portion of said seal wall has a thickness which is gradually increased from one end connected to said outer half portion toward the other end connected to said base portion.

5. A weather strip according to claim 3, wherein said weather strip is formed from sponge rubber.

6. A weather strip according to claim 3, wherein said seal wall is formed from sponge rubber and the other portion of said weather strip is formed from solid rubber.

7. A weather strip according to claim 3, wherein said outer portion is formed from sponge rubber and the other portion of said weather strip is formed from solid rubber.

* * * * *